United States Patent
Chintalapati et al.

(10) Patent No.: US 12,210,648 B2
(45) Date of Patent: Jan. 28, 2025

(54) DETECTING PERSONALLY IDENTIFIABLE INFORMATION IN DATA ASSOCIATED WITH A CLOUD COMPUTING SYSTEM

(71) Applicant: Microsoft Technology Licensing, LLC, Redmond, WA (US)

(72) Inventors: Sekhar Poornananda Chintalapati, Redmond, WA (US); Vinod Kumar Yelahanka Srinivas, Bellevue, WA (US); Dattatraya Baban Rajpure, Sammamish, WA (US); Pieter Kristian Brouwer, Redmond, WA (US); Gaurav Anil Yeole, Vancouver (CA); Mihai Silviu Peicu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 17/830,237

(22) Filed: Jun. 1, 2022

(65) Prior Publication Data

US 2023/0394168 A1    Dec. 7, 2023

(51) Int. Cl.
*G06F 21/62* (2013.01)
*G06F 16/174* (2019.01)
(Continued)

(52) U.S. Cl.
CPC ........ *G06F 21/6245* (2013.01); *G06F 16/174* (2019.01); *G06F 40/284* (2020.01); *G06F 40/295* (2020.01)

(58) Field of Classification Search
CPC .. G06F 21/6245; G06F 16/174; G06F 40/284; G06F 40/295
See application file for complete search history.

(56) References Cited

U.S. PATENT DOCUMENTS

| | | | |
|---|---|---|---|
| 2013/0132927 A1* | 5/2013 | Kraft | G06F 40/18 717/106 |
| 2013/0332460 A1* | 12/2013 | Pappas | G06F 16/35 707/740 |

(Continued)

OTHER PUBLICATIONS

"International Search Report and Written Opinion Issued in PCT Application No. PCT/US23/018769", Mailed Date: Jul. 7, 2023, 10 Pages.

(Continued)

*Primary Examiner* — Lesa M Kennedy
(74) *Attorney, Agent, or Firm* — Ranjeev Singh; Singh Law, PLLC

(57) ABSTRACT

Methods and systems for detecting personally identifiable information in data associated with a cloud computing system are described. An example method includes ingesting the data associated with the cloud computing system to generate source data. The method includes processing the source data by: performing cell-based de-duplication to generate cell-based de-duplicated data, subjecting the cell-based de-duplicated data to regular expression classification to generate a first subset of initial results, tokenizing the cell-based de-duplicated data to generate tokenized data, and de-duplicating the tokenized data and subjecting de-duplicated tokenized data to a first named entity recognition classification to generate a second subset of the initial results. The method includes cross-referencing the cell-based de-duplicated data and the initial results and subjecting output of the cross-referencing to a second named entity recognition classification to generate final results. The method includes processing the final results to detect any personally identifiable information in the final results.

20 Claims, 11 Drawing Sheets

(51) Int. Cl.
*G06F 40/284* (2020.01)
*G06F 40/295* (2020.01)

(56) References Cited

U.S. PATENT DOCUMENTS

| | | |
|---|---|---|
| 2016/0204992 A1 | 7/2016 | Gurevich et al. |
| 2019/0155930 A1* | 5/2019 | Fender ................ G06F 16/2282 |
| 2021/0026982 A1 | 1/2021 | Amarendran et al. |
| 2021/0125615 A1 | 4/2021 | Medalion et al. |
| 2021/0133347 A1 | 5/2021 | Kihneman et al. |

OTHER PUBLICATIONS

Sagir, et al., "Azure Data Explorer Data Ingestion Overview", Retrieved from: https://docs.microsoft.com/en-us/azure/data-explorer/ingest-data-overview, Mar. 8, 2022, 10 Pages.

* cited by examiner

| CATEGORY | FULLY QUALIFIED TABLE NAME | PII COLUMN | OPERATION NAME | PII DETECTION SCORE | TEXT | REPORT TIME STAMP | LEAK PROPERTIES |
|---|---|---|---|---|---|---|---|
| Email | TraceEvents.Prod | Message | CreateTable | 1 | (alice@example.com) | 4/13/2022 | (IsExternal: False) |
| Email | OperationEvents.Prod | Exception | UpdateRow | 1 | (johnsmith@example.com) | 4/13/2022 | (IsExternal: True) |
| IP Address | CommunicationEvents.Prod | CustomDimensions | DropRows | 0.95 | (123.43.5.23, 324.54.23.24) | 4/13/2022 | |
| Person | PortalTracing.Production | TraceMessage | ProcessRequest | 0.9 | John Smith, Bob | 4/13/2022 | |

DETECTING PERSONALLY IDENTIFIABLE INFORMATION IN DATA ASSOCIATED WITH A CLOUD COMPUTING SYSTEM

BACKGROUND

Increasingly, computing, storage, and network resources are accessed via the public cloud, private cloud, or a hybrid of the two. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Cloud service providers offer access to these resources by offering cloud computing and storage resources to customers.

Telemetry and other data associated with such cloud computing systems can include personally identifiable information that may be inadvertently leaked. There is a need for methods and systems to address issues surrounding potential leaks of personally identifiable information in cloud environments.

SUMMARY

In one aspect, the present disclosure relates to a method implemented by a processing system, including at least one processor. The method may include ingesting data associated with a cloud computing system to generate source data. The method may further include after the ingesting, as part of a first pass, processing the source data by: performing cell-based de-duplication to generate cell-based de-duplicated data, subjecting the cell-based de-duplicated data to regular expression classification to generate a first subset of initial results, tokenizing the cell-based de-duplicated data to generate tokenized data, and de-duplicating the tokenized data and subjecting de-duplicated tokenized data to a first named entity recognition classification to generate a second subset of the initial results.

The method may further include after performing the first pass, as part of a second pass, cross-referencing the cell-based de-duplicated data and the initial results and subjecting output of the cross-referencing to a second named entity recognition classification to generate final results. The method may further include processing the final results to detect any personally identifiable information in the final results.

In another aspect, the present disclosure relates to a processing system, including at least one processor, the processing system comprising instructions that, when executed by the at least one processor, perform operations including ingest data associated with a cloud computing system to generate source data. The operations may further include after ingesting, as part of a first pass, process the source data by operations including: perform cell-based de-duplication to generate cell-based de-duplicated data, subject the cell-based de-duplicated data to regular expression classification to generate a first subset of initial results, tokenize the cell-based de-duplicated data to generate tokenized data, and de-duplicate the tokenized data and subject de-duplicated tokenized data to a first named entity recognition classification to generate a second subset of the initial results.

The processing system may further include instructions that, when executed by the at least one processor, perform operations, including after performing the first pass, as part of a second pass, cross-reference the cell-based de-duplicated data and the initial results and subject output of the cross-reference operation to a second named entity recognition classification to generate final results. The processing system may further include instructions that, when executed by the at least one processor, perform operations, including process the final results to detect any personally identifiable information in the final results.

In yet another aspect, the present disclosure relates to a method implemented by a processing system, including at least one processor. The method may include ingesting telemetry associated with a cloud computing system and generating batches of source data based on ingested telemetry, where each batch is identifiable using an associated batch identifier. The method may further include as part of a first pass, processing each batch of source data by: performing cell-based deduplication to generate cell-based de-duplicated data, subjecting the cell-based de-duplicated data to regular expression classification to generate a first subset of initial results, tokenizing the cell-based de-duplicated data to generate tokenized data, and de-duplicating and filtering the tokenized data to generate de-duplicated tokenized data and subjecting the de-duplicated tokenized data to a first named entity recognition classification to generate a second subset of the initial results.

The method may further include after performing the first pass, as part of a second pass, cross-referencing the cell-based de-duplicated data and the initial results and subjecting output of the cross-referencing to a second named entity recognition classification to generate final results. The method may further include processing the final results to detect any personally identifiable information (PII) in the final results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 7 shows an output table of the detection layer of FIG. 5 in accordance with one example;

DETAILED DESCRIPTION

Figure 1:
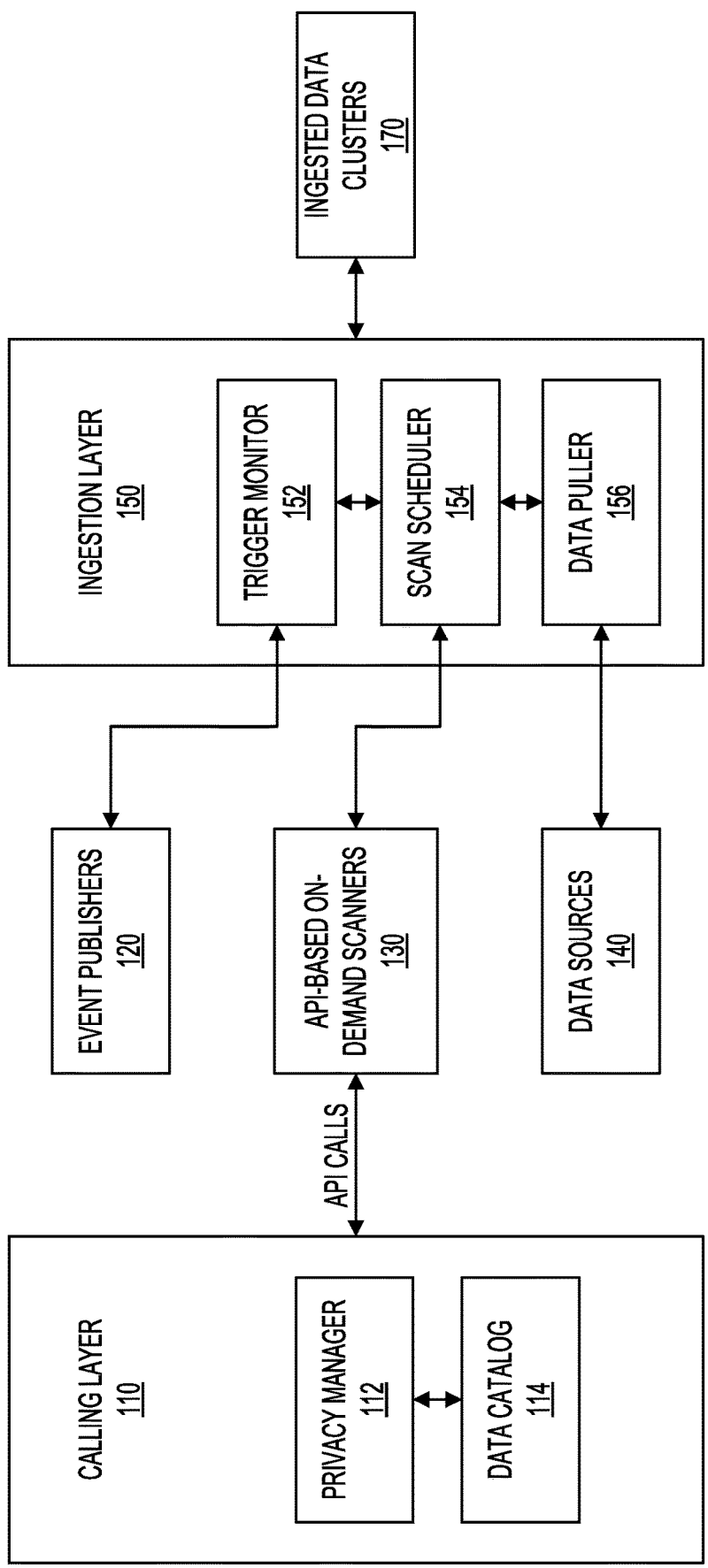
FIG. 1 shows a block diagram of a system portion for detecting personally identifiable information in accordance with one example.

Examples described in this disclosure relate to methods and systems for detecting personally identifiable information in data associated with a cloud computing system. Certain examples relate to the detection and tracing of personally identifiable information in a cloud computing system. The computing system may be a public cloud, a private cloud, or a hybrid cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers.

Services, applications, and other executable code in the cloud can generate a significant amount of telemetry associated during operation. As used herein, the term "telemetry" means data concerning the use, consumption, operation, and/or performance of software, services, systems, applications, and components thereof, including for example, but without limitation, how often certain features are used, measurements of start-up time and processing time, hardware involved, application crashes, individual window metrics, system operations, counts of used features, individual function timings, general usage statistics, and user behavior. In general, telemetry is not supposed to contain any personally identifiable information that can be traced back to a particular user who was logged in or who was performing the operation. As used herein, the term "personally identifiable information" ("PII") means any information that permits the identity of a user to be directly or indirectly inferred, including any information that is linked or linkable to that user, including for example, but without limitation, a user's name, a user's race or gender, a user's religion, a user's mailing address, a user's email address, a user's phone number, an IP address that is traceable to a specific user, a user's geolocation, a user's social security number, a user's date and/or place of birth, a user's mother's maiden name, a user's credit card number, a user's bank account number, a user's passport number, and a user's driver's license number or the like.

Personally identifiable information can leak into telemetry even when the developers take great care to remove personally identifiable information from their logging. These leaks may happen at a frequency that is much smaller than leaks that are easily identifiable because such leaks occur at a higher frequency. As an example, the frequency of these leaks may be 1 in a million rows or 1 in 10 million rows. The overall amount of telemetry is exceedingly high making a naive deep scan of the activity logs cost prohibitive. The personal data being logged may also be embedded in a high volume of non-personal data, making discoverability harder—making it essentially a needle in a haystack problem.

FIG. 1 shows a block diagram of a system portion 100 for detecting personally identifiable information in accordance with one example. System portion 100 includes several components that can be used to process telemetry and other data and ingest such data into a form that may be further processed. In this example, system portion 100 may include a calling layer 110, event publishers 120, API-based on-demand scanners 130, data sources 140, an ingestion layer 150, and ingested data clusters 170. Calling layer 110 may include a privacy manager 112 and data catalog 114. Privacy manager 112 may be implemented as a client calling the REST APIs of an enhanced privacy scan service to trigger enhanced scans. Data catalog 114 may be configured to perform several operations, including: (1) perform automated data discovery through data scanning and classification across the data estate, (2) collect enterprise metadata in the cloud related to analytics and operations associated with the cloud, and (3) use lenses, such as glossary terms, classifications, and sensitivity labels to identify potential personally identifiable information. Calling layer 110 may make application program interface (API) calls to API-based on-demand scanners 130. One type of scanner may scan patterns, such as email addresses. Another type of scanner may scan for other types of sensitive data.

With continued reference to FIG. 1, event publishers 120 may relate to telemetry generated by the cloud infrastructure, including application crash summary, application utilization summary, infrastructure utilization summary, infrastructure capacity summary, infrastructure performance summary, API summary, virtual machine (VM) events, VM placement summary, VM utilization summary, VM capacity summary, and the like. Data sources 140 may include other sources of data, including SQL databases and data lake storage.

Still referring to FIG. 1, ingestion layer 150 may include a trigger monitor 152, a scan scheduler 154, and a data puller 156. In this example, ingestion layer 150 is responsible for managing the ingestion of data that is analyzed further towards the detection of any PII. Trigger monitor 152 may monitor the set of events published by event publishers 120. In one example, based on the monitoring by trigger monitor 152, scan scheduler 154 may periodically initiate scanning of the events related data. Scan scheduler 154 may also schedule scanning using API-based on-demand scanners 130. Data puller 156 may pull data from data sources 140. In one example, data puller 156 may create ingested data clusters 170 that include data indexed in batches (e.g., 1 GB-sized batches). Each such batch may have an associated ingestion batch identifier to enable tracing of any personally identifiable information back to the source of the data. Data puller 156 may also pull any other scanned data and events related data and store the indexed batches as part of ingested data clusters 170. Ingested data clusters 170 are configured as an indexed store, allowing for faster searching of data. In one example, the indexing process may include indexing all columns of each index batch stored as part of ingested data clusters 170. Although FIG. 1 shows system portion 100 including certain components arranged in a certain manner, system portion 100 may include other components arranged in a similar manner or arranged differently.

Figure 2:
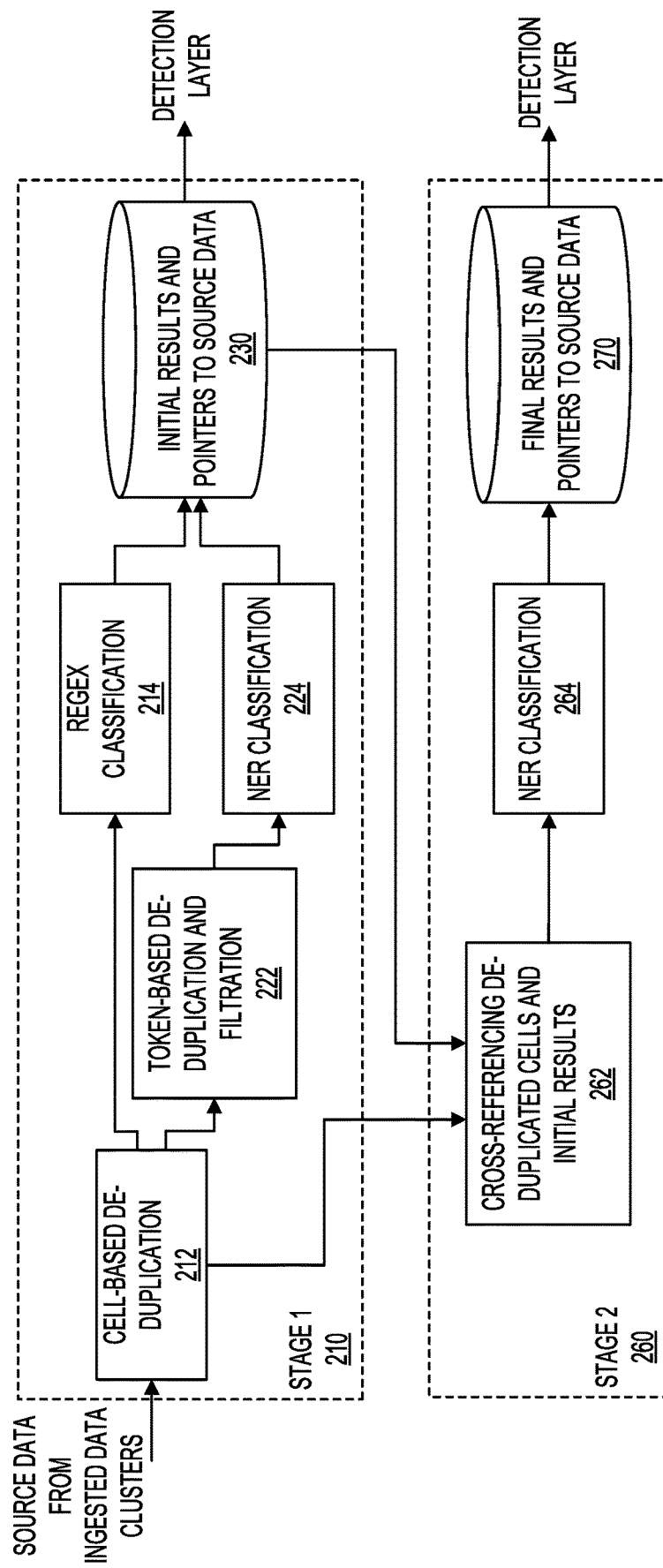
FIG. 2 shows a block diagram of an analysis layer in accordance with one example.

FIG. 2 shows a block diagram of an analysis layer 200 in accordance with one example. Analysis layer 200 may perform various types of scans on ingested data clusters 170 of FIG. 1. One type of scan may relate to scanning of patterns, such as email addresses. Another type of scan may include scanning for other types of sensitive data. Yet another type of scan may include the use of a data scanner that is configurable to scan various types of data. In addition, any of these scanners may be configurable based on the data source and load. Analysis layer 200 may include two stages: stage 1 210 and stage 2 260. These stages may be configured to process source data retrieved from ingested data clusters 170 of FIG. 1.

The two-stage arrangement of analysis layer 200 allows for the use of two passes to improve confidence with respect to the named entity recognition (NER) classification process. Stage 1 210 may be configured to perform several processes on the source data received from ingested data clusters 170 of FIG. 1. In one example, source data may include processing such data column by column for each of the indexed columns received from the tables stored as part of ingested data clusters 170 of FIG. 1. In this example, these processes include cell-based de-duplication 212, regex classification 214, token-based de-duplication and filtration 222, and name entity recognition (NER) classification 224, and storing the initial results and pointers to the source data 230 (e.g., pointers to the source data in ingested data clusters 170 of FIG. 1). Stage 2 260 may be configured to perform additional processes with respect to certain outputs and the initial results produced by stage 1 210. In this example, these processes include cross-referencing de-duplicated cells and the initial results 262, NER classification 264, and storing the final results and pointers to the source data 270 (e.g., pointers to the source data in ingested data clusters 170 of FIG. 1).

With continued reference to FIG. 2, the process of cell-based de-duplication 212 may include identifying unique cells within the source data. The cell-based de-duplication process may be run against each batch of data (e.g., a 1 GB-sized batch) included in the source data. The output of cell-based de-duplication 212 may be subjected to regular expression (regex) classification 214 to detect regular expressions or patterns found within each unique cell. Regex classification 214 may include the use of services, such as text analytics, in order to extract regular expressions or patterns. The extracted patterns or expressions, including email addresses, phone numbers, mailing addresses, or the like output from regex classification 214 and may then be processed by storing initial results and pointers to source data 230. In some scenarios, personally identifiable information may not comport with a regular expression or a pattern. As an example, personally identifiable information may be embedded in URLs, queries, or file paths. To handle such personally identifiable information, the output of cell-based de-duplication 212 may be further processed using token-based de-duplication and filtration 222.

With continued reference to FIG. 2, token-based de-duplication and filtration 222 may tokenize the input, de-duplicate it, and filter it. The purpose of tokenization is to find unique de-duplicated tokens that may contain personally identifiable information and send each of these tokens separately to the classifier. Certain tokens like '-' or '@' may be excluded since they are typically part of globally unique user identifiers (GUID)s and e-mail addresses, respectively. The tokenization process can be repeated multiple times, so that delimiting characters that are not included in one step could potentially be included in another. This entire process is configurable with the overall goal of getting unique de-duplicated tokens. De-duplication ensures that the unique tokens are found and only such unique tokens can then be passed to the classifiers. Although there may be some loss of context based on the characters used for tokenization, the advantage of this process is that it surfaces up personally identifiable information that is embedded in non-regular expressions or patterns.

In one example, to preserve intermediate context, a JavaScript Object Notation (JSON) key-value pair de-duplication process may be used after cell-based de-duplication 212 and before token-based de-duplication and filtration 222. Such JSON key-value pair de-duplication may help preserve the "intermediate context" by preserving unique key names and their values. De-duplicating the key-value pairs as a single object maintains the association between the key and its value, allowing the keys to server as context for the corresponding values. This intermediate context is required at times because in some instances of key-value pairs it is not possible to determine if a recognized entity contains PII without the context provided by the key. This is because regex classifiers detect PII by matching data patterns (e.g., regular expressions). However, pattern matching JSON key-value pairs may not be enough in some instances. As an example, any 10-digit number may match the data pattern associated with a phone number, but only some of these 10-digit numbers may be a phone number. As examples, consider two JSON key-value pairs: (i) {"Phone": "123456789" and (ii) {"TimeTakenInMs":"123456789"}. In each of these examples, although both values (123456789) match the data pattern associated with a phone number, the context provided by the respective key helps in determining that while the first example contains PII, the second example does not. In other words, to reduce such false positives, preserving the context, such as the key for JSON key-value pairs is helpful. This is particularly helpful in case of data obtained as telemetry, which can have a significant number of duplicate key-value pairs in the JSON data. The de-duplication of such JSON key-value pairs while maintaining the intermediate context provided by the keys results in more accurate determination of PII.

As part of token-based de-duplication and filtration 222, filtration may be used to reduce the size of the working set that requires further analysis by discarding certain information that is not likely to contain personally identifiable information. As an example, token-based de-duplication and filtration 222 may be configured to discard GUIDs and timestamps. The output of token-based de-duplication and filtration 222 may be provided to NER classification 224. NER classification 224 may process the output received from token-based de-duplication and filtration 222 to locate and classify named entities in the unstructured data received from token-based de-duplication and filtration 222 into pre-defined categories, such as email addresses, mailing addresses, phone numbers, or the like. The various processes performed as part of stage 1 210 are referred to as a first pass.

Still referring to FIG. 2, stage 2 260 may be used to perform a second pass to perform additional processes. In this example, these processes include cross-referencing de-duplicated cells and the initial results 262, NER classification 264, and storing the final results and pointers to the source data 270 (e.g., pointers to the source data in ingested data clusters 170 of FIG. 1). The cross-referencing process may process the output of cell-based de-duplication 212 and compare this output with the initial results obtained after the completion of the processes performed as part of stage 1 210 (e.g., the initial results stored as part of storing initial results and pointers to source data 230). The purpose of this comparison is to identify every row in the cells produced by cell-based de-duplication 212 that includes at least one of the initial results found after the completion of the processes associated with stage 1 210. By comparing the initial results with the cell-based de-duplication 212 output, which has not yet been subjected to token-based de-duplication and filtration 222, the second pass may help preserve information that may have been lost during token-based de-duplication and filtration 222. As an example, the tokenization process as a result of aggressive de-duplication may split personally identifiable information into patterns or expressions that may not have been recognized by NER classification 224. The output of cross-referencing de-duplication cells and initial results 262 may be provided to NER classification 264. The cross-referencing of the initial results with information that had not been subjected to tokenization yet may help identify additional personally identifiable information using NER classification 264. The final step may include taking the output of NER classification 264 and storing the final results and pointers to the source data 270 (e.g., pointers to the source data in ingested data clusters 170 of FIG. 1). Although FIG. 2 shows analysis layer 200 as being implemented in a certain way using a certain sequence of processes, analysis layer 200 may be implemented in other ways, including additional stages or processes.

Figure 3:
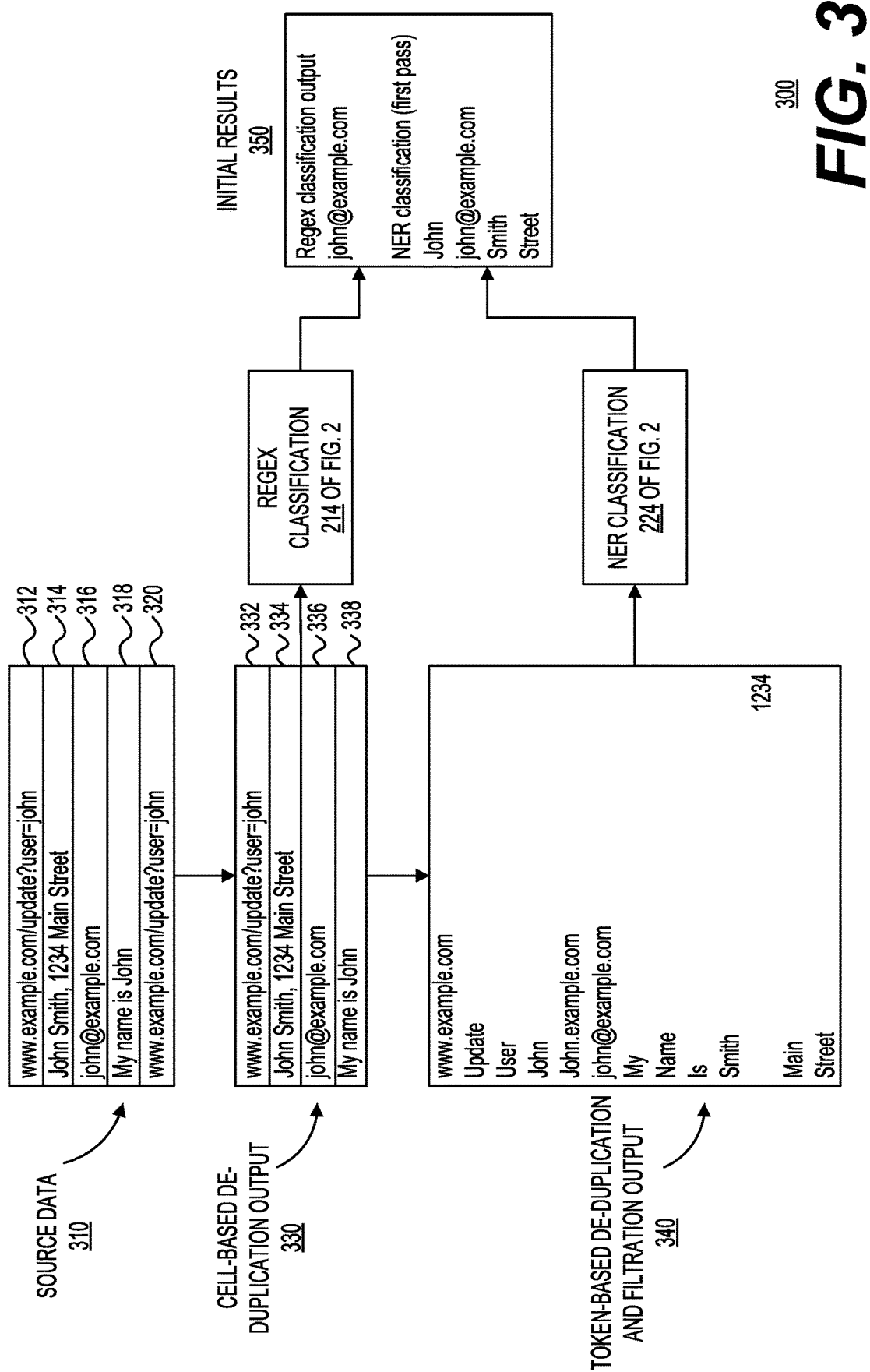
FIG. 3 shows processing of source data as part of a first pass performed by stage 1 of analysis layer of FIG. 2 in accordance with one example.

FIG. 3 shows processing 300 of source data as part of a first pass performed by stage 1 210 of FIG. 2 in accordance with one example. In this example, source data 310 includes five cells (312, 314, 316, 318, and 320) of data. As shown, cell 312 and cell 320 are duplicates—in that each of these cells contains the same input data: www.example.com/update?user=john. The output of the cell-based de-duplication (e.g., cell-based de-duplication 212 of FIG. 2) process shown as cell-based de-duplication output 330 illustrates that cell 320, which was a duplicate, has been removed. Accordingly, cell-based de-duplication output 330 includes four cells (332, 334, 336, and 338) only. The output of the cell-based de-duplication process is subjected to token-based de-duplication and filtration (e.g., token-based de-duplication and filtration 222 of FIG. 2). Token-based de-duplication output 340 shows de-duplicated tokens. Initial results 350 shows the initial results obtained as a result of subjecting cell-based de-duplication output to regex classification 214 of FIG. 2. In addition, initial results 350 shows the initial results obtained as a result of subjecting token-based de-duplication output 340 to NER classification 224 of FIG. 2.

Figure 4:
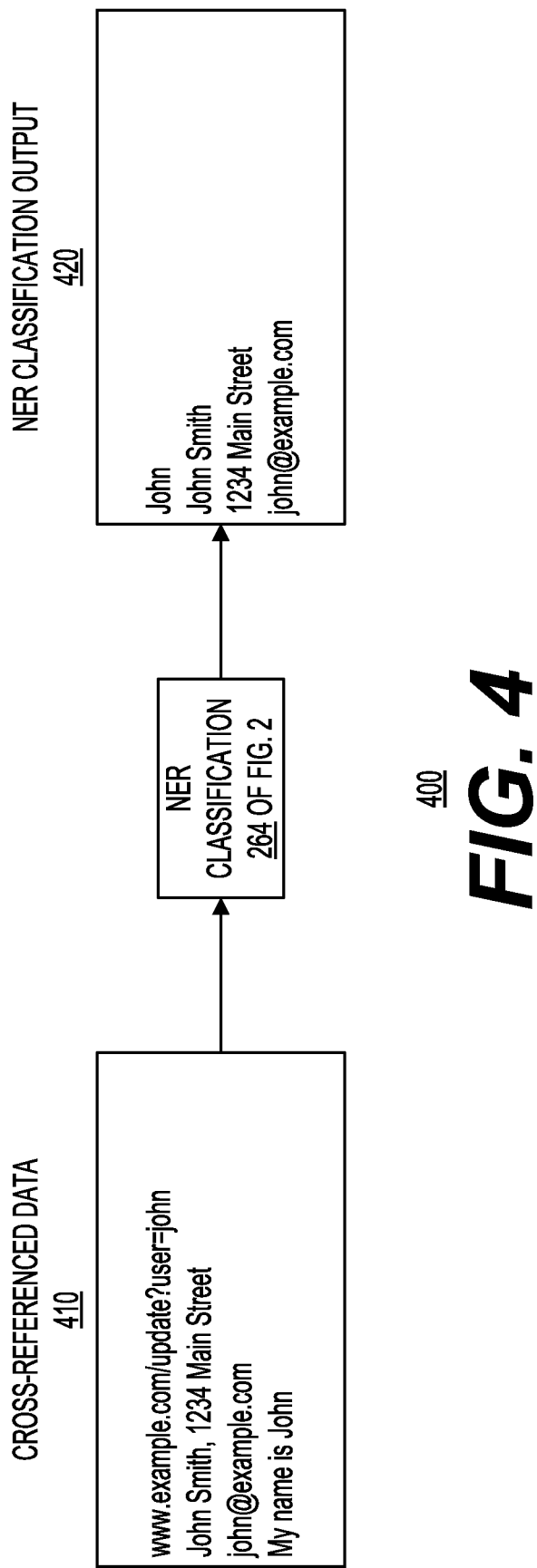
FIG. 4 shows processing as part of a second pass performed by stage 2 of analysis layer of FIG. 2 in accordance with one example.

FIG. 4 shows processing 400 as part of a second pass performed by stage 2 260 of FIG. 2 in accordance with one example. The second pass generates cross-referenced data 410. In this example, the cross-referenced data 410 is the same as the cell-based de-duplication output 330 of FIG. 3. This is because as explained earlier, the cross-referencing process may process the output of cell-based de-duplication and compare this output with the initial results obtained after the completion of the processes performed as part of the first pass. The purpose of this comparison is to identify every row in the cells produced by the cell-based de-duplication process that includes at least one of the initial results found after the completion of the processes associated with stage 1 210 of FIG. 2. By comparing the initial results with the cell-based de-duplication output, which has not yet been subjected to the process of token-based de-duplication and filtration, the second pass may help preserve information that may have been lost during the process of token-based de-duplication and filtration. In this example, no such information has been lost. Cross-referenced data 410 is then subjected to NER classification 264 of FIG. 2. That in turn results in NER classification output 420, including only the entities that were recognized and thus could be PII.

Figure 5:
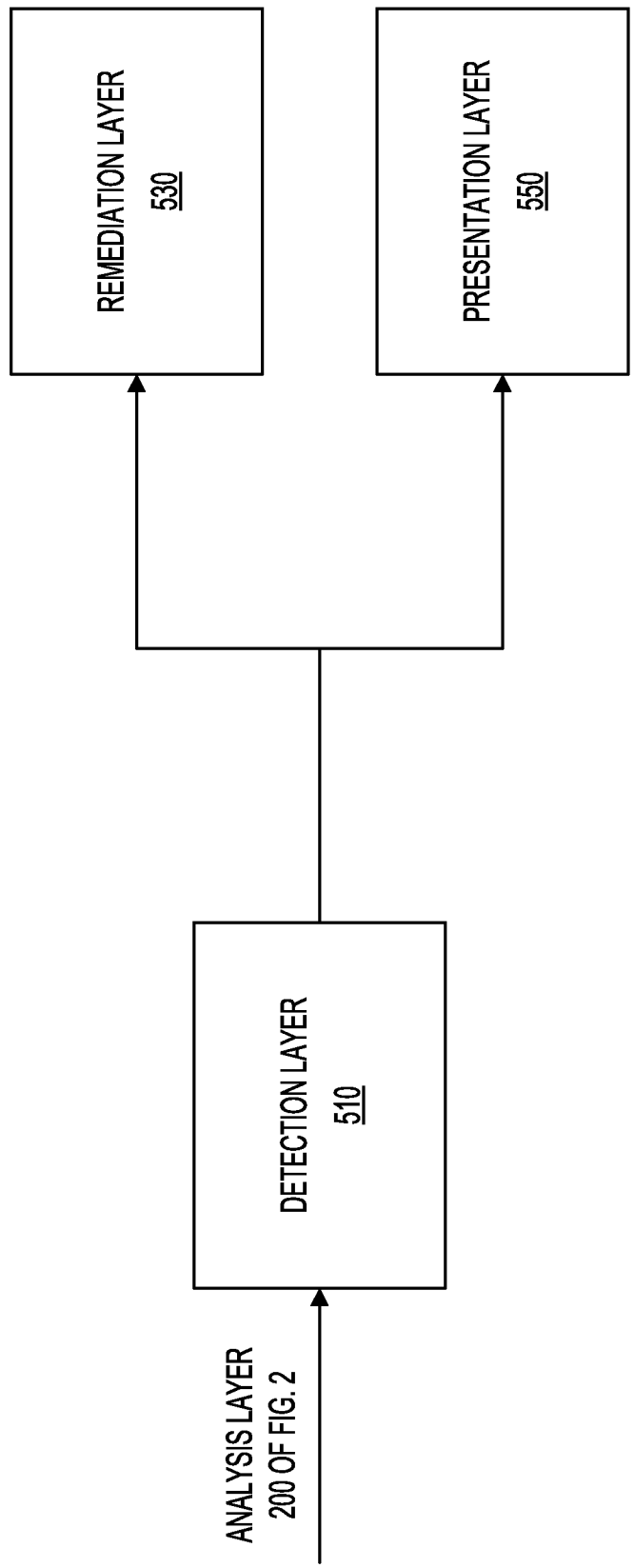
FIG. 5 shows a block diagram of a system portion for detecting personally identifiable information in accordance with one example.

FIG. 5 shows a block diagram of a system portion 500 for detecting personally identifiable information (PII) in accordance with one example. Although running multiple passes with multiple classifiers improves confidence as well as the range of detection, further processing is needed before one can identify PII leaks. As an example, all IP addresses are not necessarily personally identifiable information. Additional processing such as distinguishing private IP addresses from public IP addresses may help. Similarly, certain names that appear in certain logs are not necessarily the names of a person, rather they may indicate a maximum value that a variable can take (e.g., the word Max for identifying the maximum value). System portion 500 includes several components that can be used to further process the output from analysis layer 200 of FIG. 2. In this example, system portion 500 may include a detection layer 510, a remediation layer 530, and a presentation layer 550. Detection layer 510 may be configured to increase the fidelity of the data output by the analysis layer (e.g., by reducing the false positives generated by the analysis layer). In this example, detection layer 510 processes the analyzed data and ranks the leaks for prioritization purposes. The purpose of detection layer 510 is to output ranked results. The ranking of the results may be used to determine actions commensurate with the ranking. As an example, the highest confidence results may cause automatic notifications of PII leaks and medium confidence results may require further analysis.

With continued reference to FIG. 5, detection layer 510 may be configured to apply value rules and context rules to the output of analysis layer 200 of FIG. 2. Value rules may be used to filter out the false positives related to the personally identifiable information (PII) identified by the analysis layer. Example value rules for IP addresses may include: (1) removing identified PII that has a confidence score (generated as a result of the analysis performed by analysis layer 200 of FIG. 2) lower than a score threshold; (2) excluding any PII if the source of the PII corresponds to columns that should be excluded (e.g., columns that are unlikely to contain PII), (3) determining whether an IP address is a private IP address or a public IP address, and based on this determination excluding private IP addresses; and (4) determining whether an IP address is a real IP address or a DLL version number. Example value rules for a person's name may include: (1) removing identified PII that has a confidence score (generated as a result of the text analysis performed by analysis layer 200 of FIG. 2) lower than a score threshold; and (2) excluding any PII if the source of the PII corresponds to columns that should be excluded (e.g., columns that are unlikely to contain PII. Example value rules for email addresses may include: (1) removing identified PII that has a confidence score (generated as a result of the text analysis performed by analysis layer 200 of FIG. 2) lower than a score threshold; (2) excluding any PII if the source of the PII corresponds to columns that should be excluded (e.g., columns that are unlikely to contain PII), (3) determining whether the person's name matches a list of usernames (e.g., admin, support, noreply, or the like) that are not PII, and based on this determination excluding such names; and (4) determining whether the character length of the username exceeds a maximum allowed character length (e.g., 64 characters), and then excluding those person's names that exceed the maximum allowed character length. These value rules are merely examples, and other value rules may be included as part of detection layer 510.

Still referring to FIG. 5, context rules may be used to help determine a normalized personally identifiable information (PII) score for any PII that is still indicated as being present after the application of the value rules described above. Context rules may be related to the context of the data in which PII was found. In one example, the PII detection score may be calculated based on how many context rules are satisfied by the purported PII. A normalized PII score may be calculated by determining a weighted average of the context rules that are satisfied by the PII. Context rules may comprise an "inclusion list" per entity to include certain context strings. Context rules may also comprise an "exclusion list" per entity to exclude certain context strings. As an example, for an IP address, the inclusion list may have context strings, such as "clientIP," "IPAddress," and "IP Address," and the exclusion list may have context strings, such as "Version," "AssemblyVersion," "Host name," and "requestURI." As another example, for a person's name, the inclusion list may have context strings, such as "URL," URI," and requestURI," and the exclusion list may have context strings, such as "HostName" and "AffinityKey." As yet another example, for an email address, the exclusion list may have context strings, such as "message id." In one example, any combination of the value rules and context rules may be specified in order to act as a final sieve in the process of personally identifiable information (PII) identification.

Figure 6:
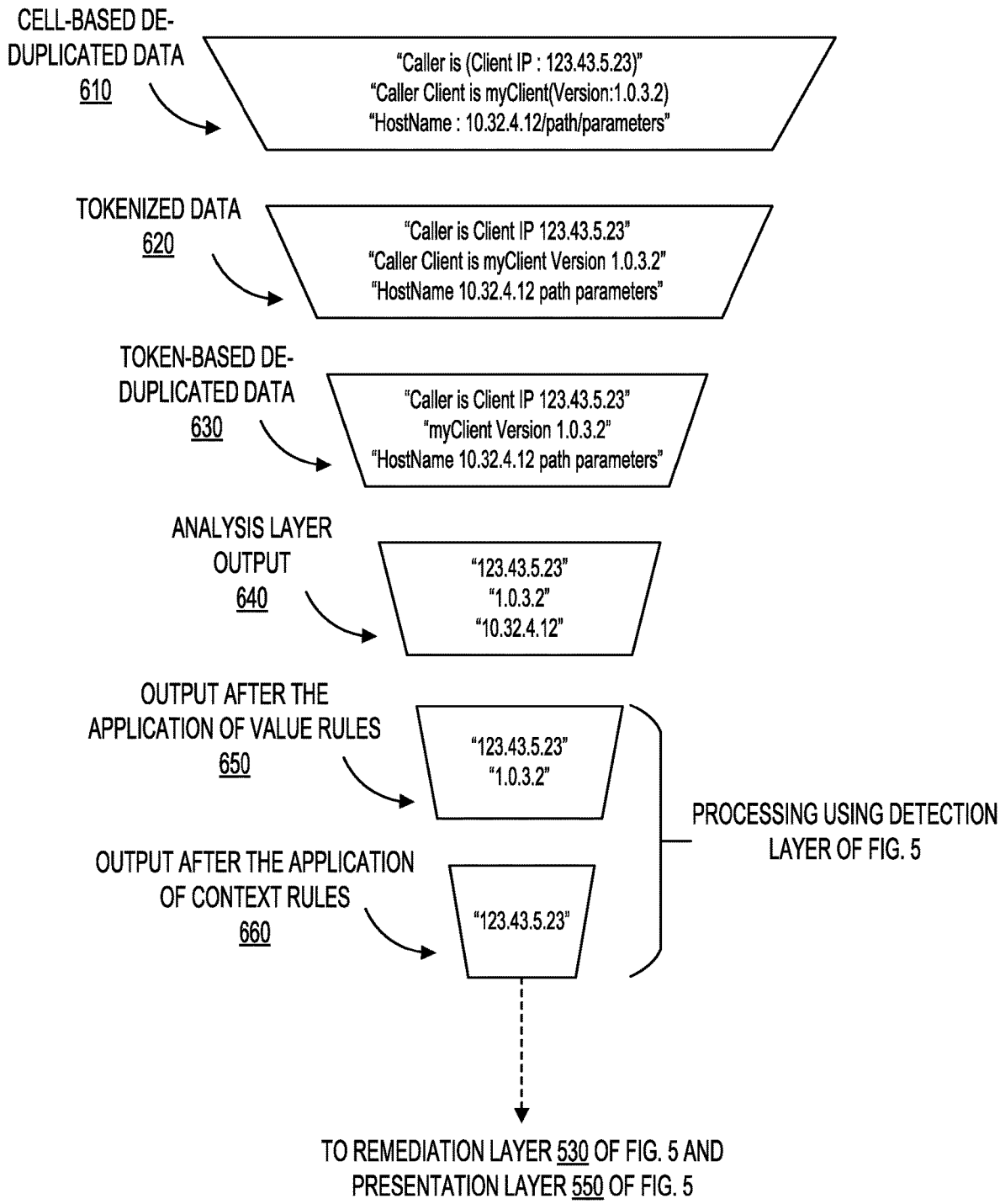
FIG. 6 shows an example application of value rules and context rules for IP addresses.

FIG. 6 shows example application of value rules and context rules for IP addresses. As shown in FIG. 6, as data is processed by various layers and associated processes, the final set of any personally identifiable information leaks includes much less information than originally ingested. In this example, cell-based de-duplicated data 610 is shown at the top. As explained earlier, the ingested data is processed by an analysis layer, which performs processing using two passes. As part of the first pass, cell-based de-duplication is performed resulting in cell-based de-duplicated data 610. Tokenization of this data results in tokenized data 620. Token-based de-duplication of tokenized data 620 results in token-based de-duplicated data 630. After completing the remaining processes described as part of the first pass and the second pass with respect to FIG. 2 (e.g., first pass NER classification, cross-referencing, and the second pass NER classification), analysis layer output 640 is obtained. In this example, the analysis layer output 640 includes three IP addresses: "123.43.5.23," "1.0.3.2," and "10.32.4.12." As explained earlier, one of the value rules for IP addresses incudes determining whether an IP address is a private IP address or a public IP address and based on this determination excluding private IP addresses. In this example, IP address "10.32.4.12" is a private IP address, and thus the output after the application of value rules 660 excludes this IP address. As explained earlier, one of the context rules for IP addresses determines whether the IP address is used in the context of a context string: "version." In this example, IP address "1.0.3.2" is preceded by the pattern "myClient Version" (as shown in token-based de-duplicated data 630), and thus, this IP address is excluded from the PII. This in turn results in the output after the application of context rules 670 to include only the IP address "123.43.5.23." As shown in FIG. 6, the output of the detection layer (after the application of the value rules and the context rules) is provided to remediation layer 530 of FIG. 5 and to presentation layer 550 of FIG. 5.

FIG. 7 shows an output table 700 of detection layer 510 of FIG. 5 in accordance with one example. Output table 700 comprises several columns, including columns identified as: Category 710, Fully Qualified Table Name 720, PII Column 730, Operation Name 740, PII Detection Score 750, Text 760, Report Time Stamp 770, and Leak Properties 780. Category 710 specifies the category to which the PII belongs. Example categories include an email address, an IP address, or a person's name. Fully Qualified Table Name 720 includes the full table name that contained the PII. PII Column 730 includes the column which contained the PII (e.g., the message column, the exception column, or the like). Operation Name 740 specifies operation that caused the PII leak (e.g., CreateTable, UpdateRow, or the like). Output table 700 groups the potential PII leaks by Operation Name 740. In the multi-classifier approach, the same PII can be detected in multiple classifiers. The detection layer using additional post-processing takes care of the aggregation of the classification from multiple sources and generates a unique signal per leak. Having the ability to combine multiple classifiers is useful since all classifiers do not detect all entities related to PII leaks with equal confidence. Some classifiers are better at some entities while others are better at other entities.

With continued reference to FIG. 7, the PII Detection Score 750 column of output table 700 may include a confidence score (generated as a result of the text analysis performed by analysis layer 200 of FIG. 2). The confidence score may be normalized such that appropriate comparisons could be made. Text 760 may include the detected text that is the basis for the PII leak. Report Time Stamp 770 may include the date and/or time of the detection of the PII leak. Leak Properties 780 may include additional information concerning the PII leak. As an example, Leak Properties 780 may include information concerning whether the PII leak is related to internal information or external information. Although output table 700 of FIG. 7 is shown as a certain number of columns arranged in a certain manner, output table 700 may include additional or fewer columns arranged differently. As an example, output table 700 may include activity names and/or activity identifiers (when available) associated with each PII leak. Moreover, the information shown in output table 700 may be communicated using other formats.

Returning to FIG. 5, remediation layer 530 may consume the highest confidence results generated by detection layer 510 to generate signals that can be used to scrub PII or otherwise remedy PII leaks. In a distributed system (e.g., a cloud computing system), multiple events that may be the source of a PII leak can be happening at the same precise timestamp. Remediation layer 530 may make the PII leaks traceable (e.g., by identifying the location of the PII leaks in the source data). Detection tables can have over 50,000 rows sharing the same timestamp. In such a circumstance, additional information may be required to uniquely identify a leak. Such additional categories of information may include an Ingestion Batch ID and an Ingestion Row ID, which may be included in output table 700. The Ingestion Batch ID may relate to the batches of 1 GB source data that are generated by the ingestion layer described earlier with respect to FIG. 1. Within a batch, each row may be stamped with an Ingestion Row ID. Ingestion Row ID may be used to pinpoint the exact row within a batch corresponding to the leak. Another advantage of the Ingestion Batch ID and Ingestion Row ID is the ability of the developers to collaborate across e-mail and incident management systems without revealing sensitive PII information. The Ingestion Batch ID and Ingestion Row ID pointers can also be used to build shareable queries that show where personal information was found (or where the PII originated from) for collaboration, instead of revealing the PII.

Still referring to FIG. 5, presentation layer 550 may allow a system administrator (or another authorized user) to access information related to PII leaks by enabling the system administrator to obtain enhanced reports related to the PII leaks. In addition, presentation layer 550 may allow the system administrator to view an aggregated scan report that includes all of the PII originating from a particular source. Such an aggregated scan report may include counts of PII by classification categories and associated operation names, when relevant or available. Moreover, presentation layer 550 may allow the system administrator to review the PII text itself that resulted in the detection. Presentation layer 550 may further allow on-demand scans of the data sources from which any PII originated.

Figure 8:
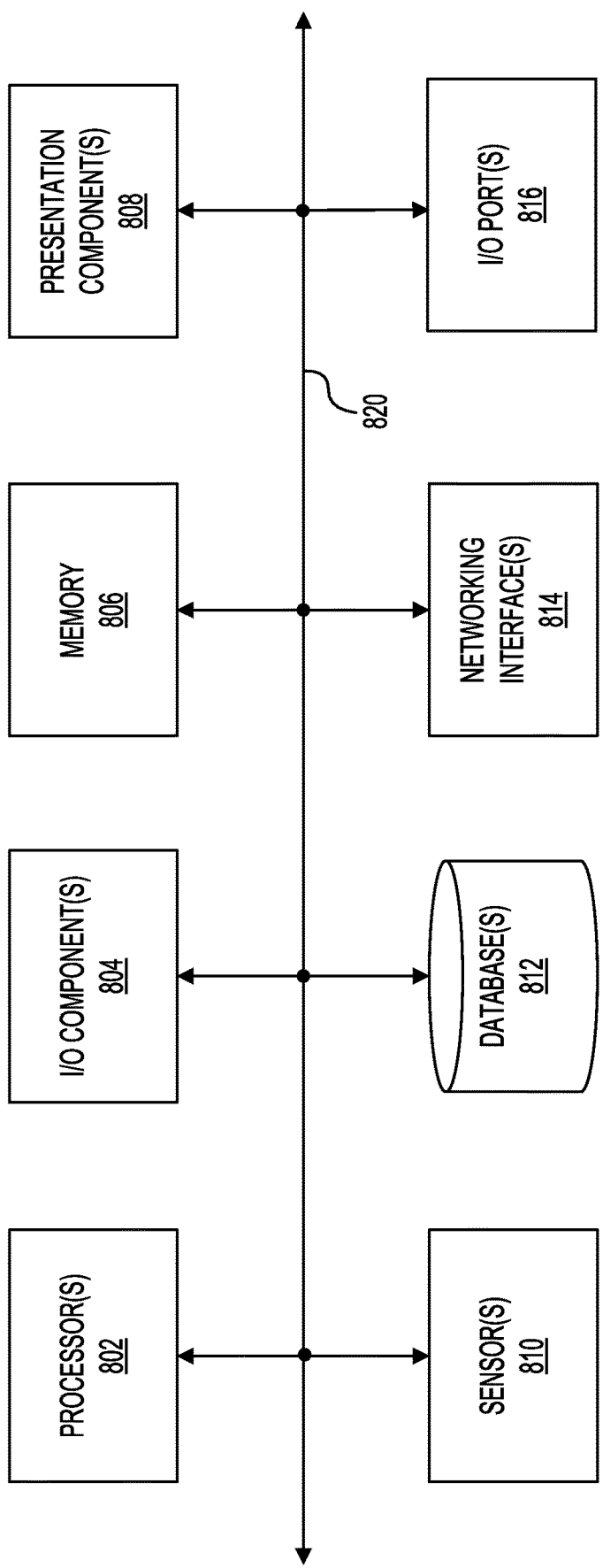
FIG. 8 is a block diagram of a computing system for performing methods associated with the present disclosure in accordance with one example.

FIG. 8 is a block diagram of a computing system 800 for performing methods associated with the present disclosure in accordance with one example. Computing system 800 can also be used to implement the processes and layers described earlier with respect to FIGS. 1, 2, and 5. Computing system 800 may be a distributed computing system including components housed in data centers, on customers' premises, or any other location. As an example, computing system 800 is used to implement the various parts of the components, services, layers, processes, and datastores described herein. Computing system 800 includes a processor(s) 802, I/O component(s) 804, a memory 806, presentation component(s) 808, sensors 810, database(s) 812, networking interfaces 814, and I/O port(s) 816, which may be interconnected via bus 820. Processor(s) 802 may execute instructions stored in memory 806 or any other instructions received via a wired or a wireless connection. Processor(s) 802 may include CPUs, GPUs, Application-Specific Integrated Circuits (ASICs), Field-Programmable Gate Arrays (FPGAs), or other types of logic configured to execute instructions. I/O component(s) 804 may include components such as a keyboard, a mouse, a voice recognition processor, or touch screens. Memory 806 may be any combination of non-volatile storage or volatile storage (e.g., flash memory, DRAM, SRAM, or other types of memories). Presentation component(s) 808 may include display(s), holographic device(s), or other presentation device(s). Display(s) may be any type of display, such as LCD, LED, or other types of display. Sensor(s) 810 may include telemetry or other types of sensors configured to detect, and/or receive, information (e.g., conditions associated with the various devices in a data center). Sensor(s) 810 may include sensors configured to sense conditions associated with CPUs, memory or other storage components, FPGAs, motherboards, baseboard management controllers, or the like. Sensor(s) 810 may also include sensors configured to sense conditions associated with racks, chassis, fans, power supply units (PSUs), or the like. Sensor(s) 810 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 8, database(s) 812 may be used to store any of the data or files (e.g., metadata store or other datasets) needed for the performance of the various methods and systems described herein. Database(s) 812 may be implemented as a collection of distributed databases or as a single database. Network interface(s) 814 may include communication interfaces, such as Ethernet, cellular radio, Bluetooth radio, UWB radio, or other types of wireless or wired communication interfaces. I/O port(s) 816 may include Ethernet ports, Fiber-optic ports, wireless ports, or other communication ports.

Instructions for enabling various systems, components, devices, methods, services, layers, and processes may be stored in memory 806 or another memory. These instructions when executed by processor(s) 802, or other processors, may provide the functionality associated with the various systems, components, devices, services, layers, processes, and methods described in this disclosure. The instructions could be encoded as hardware corresponding to a processor or a field programmable gate array. Other types of hardware such as ASICs and GPUs may also be used. The functionality associated with the systems, services, devices, components, methods, processes, and layers described herein may be implemented using any appropriate combination of hardware, software, or firmware. Although FIG. 8 shows computing system 800 as including a certain number of components arranged and coupled in a certain way, it may include fewer or additional components arranged and coupled differently. In addition, the functionality associated with computing system 800 may be distributed or combined, as needed.

Figure 9:
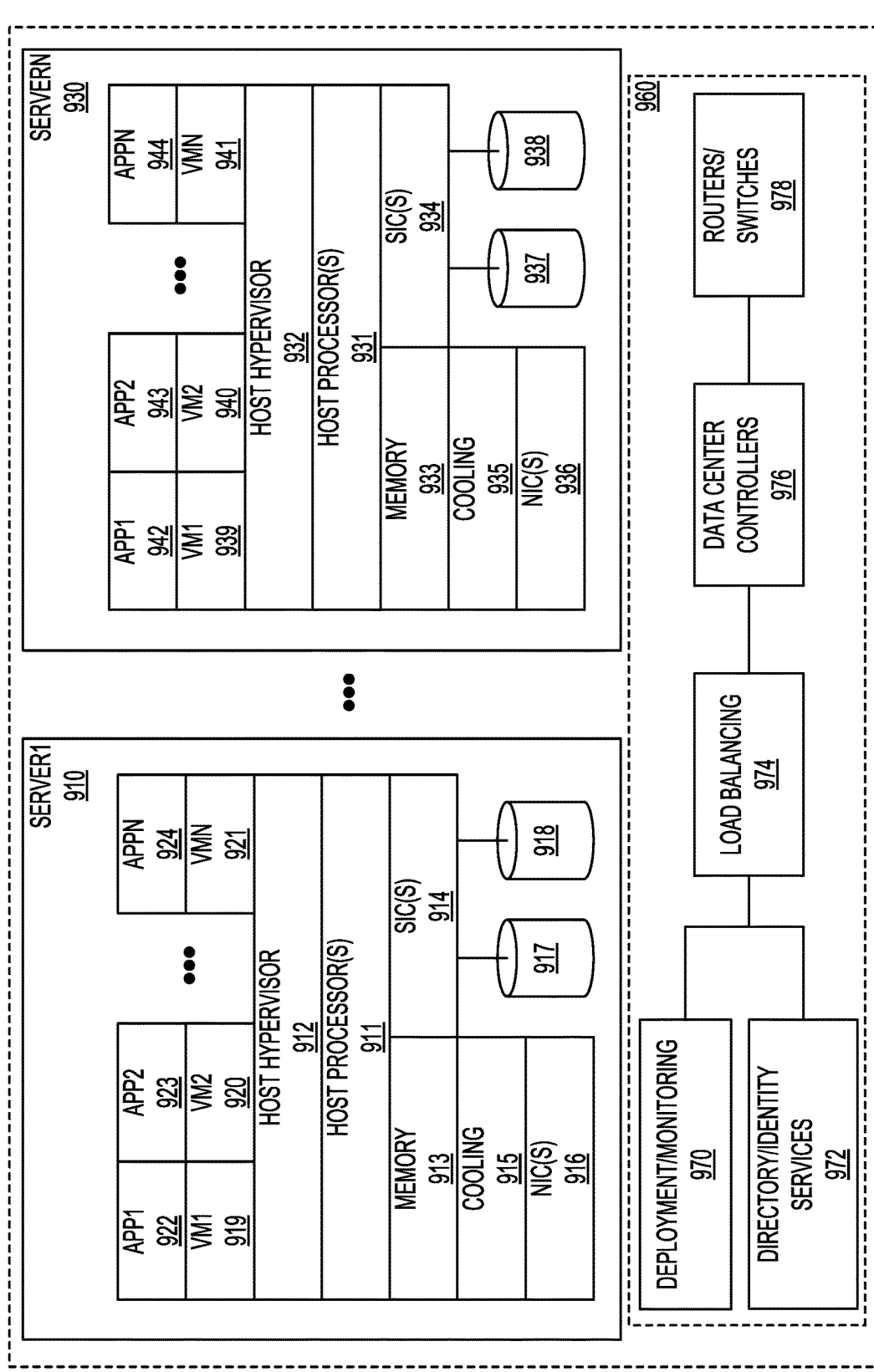
FIG. 9 shows a data center for implementing systems and methods for detecting personally identifiable information in accordance with one example.

FIG. 9 shows a data center 900 for implementing systems and methods for identifying PII in accordance with one example. As an example, data center 900 may include several clusters of racks including platform hardware, such as compute resources, storage resources, networking resources, or other types of resources. Compute resources may be offered via compute nodes provisioned via servers that may be connected to switches to form a network. The network may enable connections between each possible combination of switches. Data center 900 may include server1 910 and serverN 930. Data center 900 may further include data center related functionality 960, including deployment/monitoring 970, directory/identity services 972, load balancing 974, data center controllers 976 (e.g., software defined networking (SDN) controllers and other controllers), and routers/switches 978. Server1 910 may include CPU(s) 911, host hypervisor 912, memory 913, storage interface controller(s) (SIC(s)) 914, cooling 915, network interface controller(s) (NIC(s)) 916, and storage disks 917 and 918. ServerN 930 may include CPU(s) 931, host hypervisor 932, memory 933, storage interface controller(s) (SIC(s)) 934, cooling 935, network interface controller(s) (NIC(s)) 936, and storage disks 937 and 938. Server1 910 may be configured to support virtual machines, including VM1 919, VM2 920, and VMN 921. The virtual machines may further be configured to support applications, such as APP1 922, APP2 923, and APPN 924. ServerN 930 may be configured to support virtual machines, including VM1 939, VM2 940, and VMN 941. The virtual machines may further be configured to support applications, such as APP1 942, APP2 943, and APPN 944.

With continued reference to FIG. 9, in one example, data center 900 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI). Although FIG. 9 shows data center 900 as including a certain number of components arranged and coupled in a certain way, it may include fewer or additional components arranged and coupled differently. In addition, the functionality associated with data center 900 may be distributed or combined, as needed.

Figure 10:
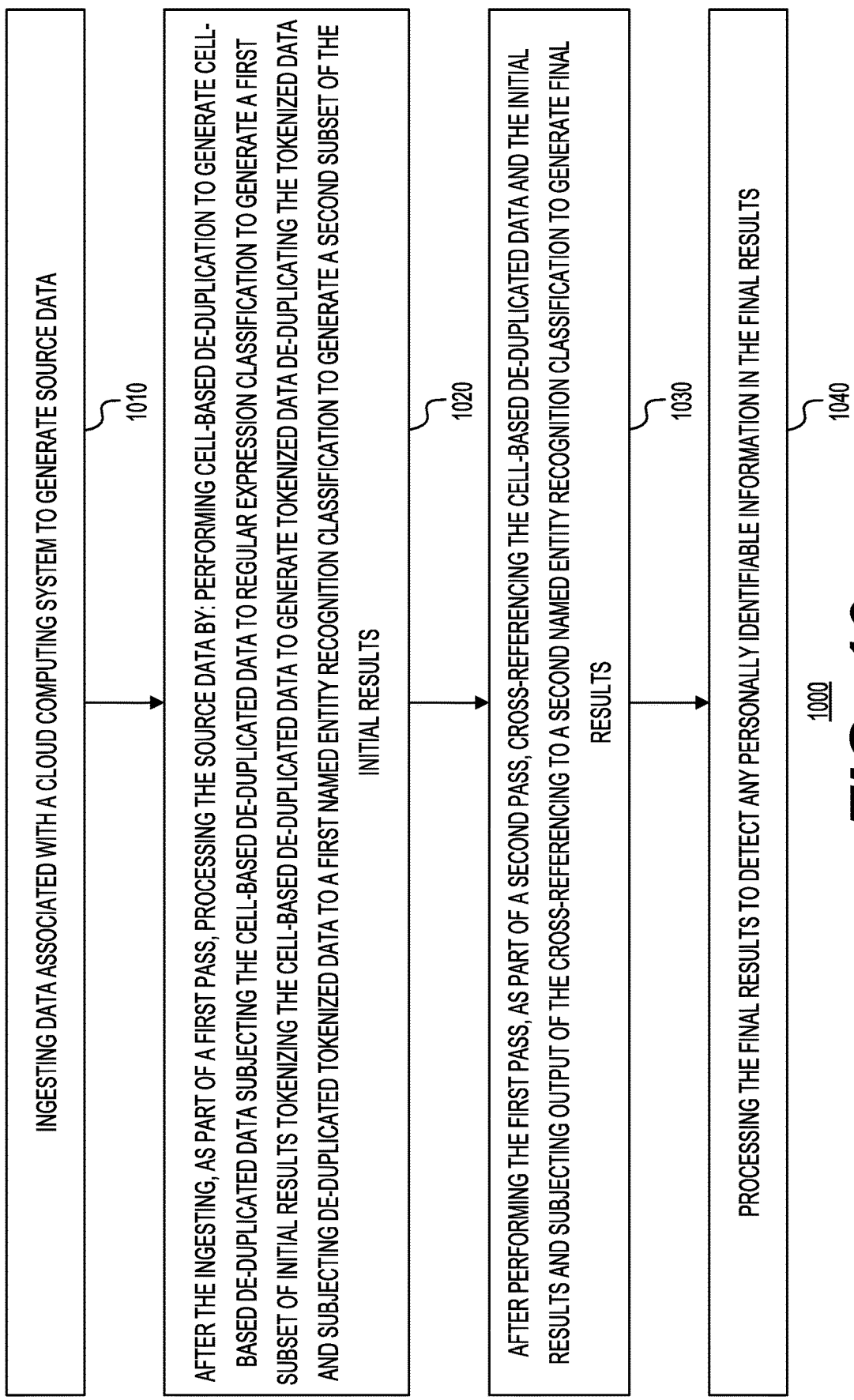
FIG. 10 shows a flowchart of a method for detecting personally identifiable information in accordance with one example.

FIG. 10 shows a flowchart 1000 of a method for detecting personally identifiable information in accordance with one example. Steps associated with this method may be performed by various layers described earlier. As explained earlier, instructions corresponding to such layers that make up the processing system for detecting personally identifiable information, when executed by at least one processor, may result in the performance of the steps described herein. Step 1010 may include ingesting data associated with a cloud computing system to generate source data. As explained earlier with respect to FIG. 1, ingesting data may include the performance of instructions related to the various components of ingestion layer 150 of FIG. 1. As explained with respect to FIG. 1, the data associated with the cloud computing system may include telemetry and data obtained by performing queries on any services or applications running in the cloud computing system. Source data may comprise indexed columns generated by ingestion layer 150 of FIG. 1.

Step 1020 may include after the ingesting, as part of a first pass, processing the source data by: performing cell-based de-duplication to generate cell-based de-duplicated data, subjecting the cell-based de-duplicated data to regular expression classification to generate a first subset of initial results, tokenizing the cell-based de-duplicated data to generate tokenized data, and de-duplicating the tokenized data and subjecting de-duplicated tokenized data to a first named entity recognition classification to generate a second subset of the initial results. In one example, step 1020 may be performed as part of the performance of instructions related to the various aspects of stage 1 210 of analysis layer 200 of FIG. 2.

Step 1030 may include after performing the first pass, as part of a second pass, cross-referencing the cell-based de-duplicated data and the initial results and subjecting output of the cross-referencing to a second named entity recognition classification to generate final results. In one example, step 1030 may be performed as part of the performance of instructions related to the various aspects of stage 2 260 of analysis layer 200 of FIG. 2.

Step 1040 may include processing the final results to detect any personally identifiable information in the final results. As explained earlier with respect to FIG. 5, processing the final results may include the performance of instructions related to the various components of detection layer 510 of FIG. 5. As explained earlier with respect to FIG. 5, processing the final results to detect any personally identifiable information in the final results may include applying value rules and context rules to the final results. In addition, the final results may include pointers to services responsible for any leaks of the personally identifiable information.

Figure 11:
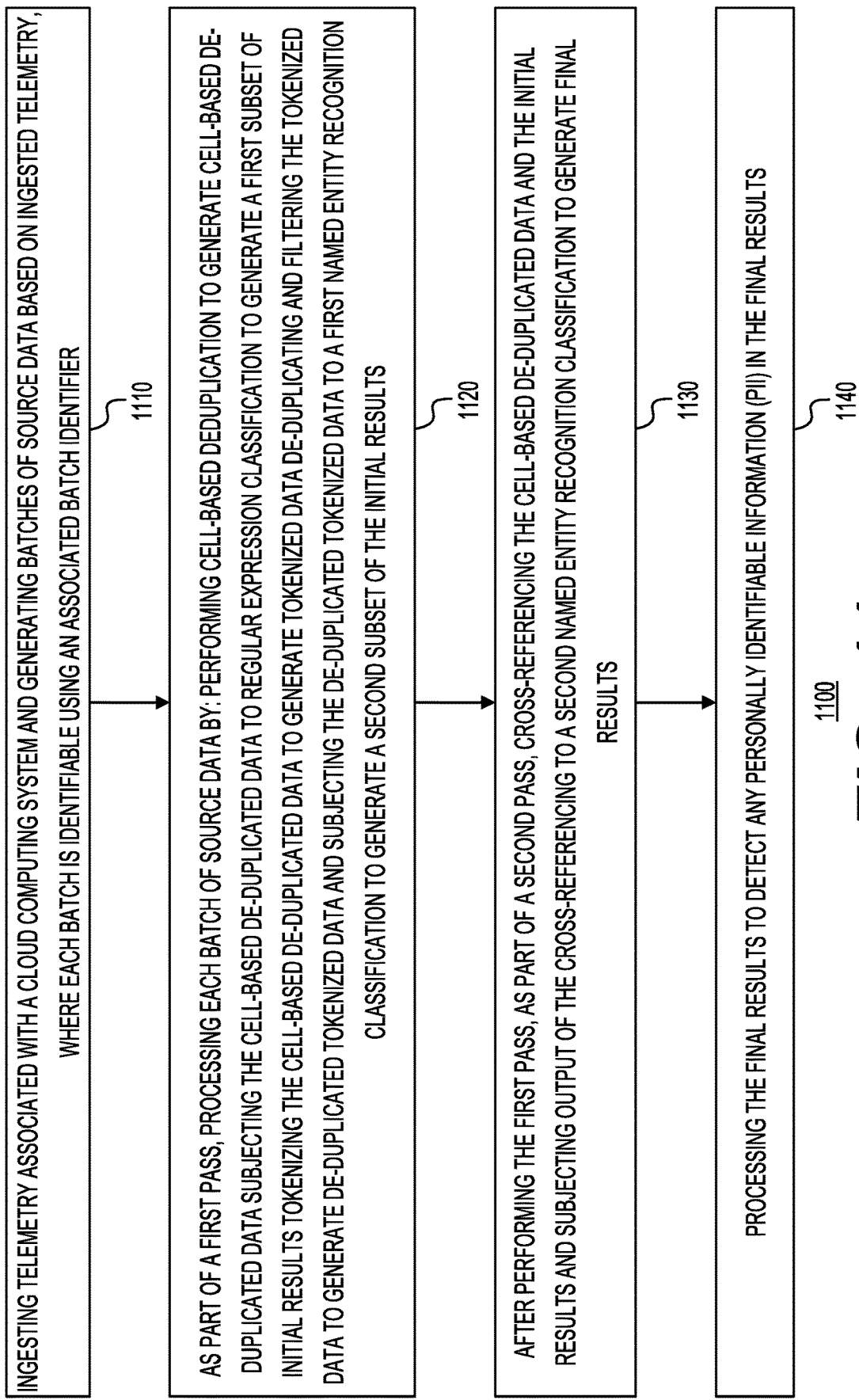
FIG. 11 shows a flowchart of another method for detecting personally identifiable information in accordance with one example.

FIG. 11 shows a flowchart 1100 of another method for detecting personally identifiable information in accordance with one example. Steps associated with this method may be performed by various layers described earlier. As explained earlier, instructions corresponding to such layers that make up the processing system for detecting personally identifiable information, when executed by at least one processor, may result in the performance of the steps described herein. Step 1110 may include ingesting telemetry associated with a cloud computing system and generating batches of source data based on ingested telemetry, where each batch is identifiable using an associated batch identifier. As explained with respect to FIG. 1, the data associated with the cloud computing system may include data obtained by performing queries on any services or applications running in the cloud computing system. Source data may comprise indexed columns generated by ingestion layer 150 of FIG. 1.

Step 1120 may include as part of a first pass, processing each batch of source data by: performing cell-based de-duplication to generate cell-based de-duplicated data, subjecting the cell-based de-duplicated data to regular expression classification to generate a first subset of initial results, tokenizing the cell-based de-duplicated data to generate tokenized data, and de-duplicating and filtering the tokenized data to generate de-duplicated tokenized data and subjecting the de-duplicated tokenized data to a first named entity recognition classification to generate a second subset of the initial results. In one example, step 1120 may be performed as part of the performance of instructions related to the various aspects of stage 1 210 of analysis layer 200 of FIG. 2.

Step 1130 may include after performing the first pass, as part of a second pass, cross-referencing the cell-based de-duplicated data and the initial results and subjecting output of the cross-referencing to a second named entity recognition classification to generate final results. In one example, step 1130 may be performed as part of the performance of instructions related to the various aspects of stage 2 260 of analysis layer 200 of FIG. 2.

Step 1140 may include processing the final results to detect any personally identifiable information (PII) in the final results. As explained earlier with respect to FIG. 5, processing the final results to detect any personally identifiable information in the final results may include applying value rules and context rules to the final results. In addition, the final results may include pointers to services responsible for any leaks of the personally identifiable information.

In conclusion, the present disclosure relates to a method implemented by a processing system, including at least one processor. The method may include ingesting data associated with a cloud computing system to generate source data. The method may further include after the ingesting, as part of a first pass, processing the source data by: performing cell-based de-duplication to generate cell-based de-duplicated data, subjecting the cell-based de-duplicated data to regular expression classification to generate a first subset of initial results, tokenizing the cell-based de-duplicated data to generate tokenized data, and de-duplicating the tokenized data and subjecting de-duplicated tokenized data to a first named entity recognition classification to generate a second subset of the initial results.

The method may further include after performing the first pass, as part of a second pass, cross-referencing the cell-based de-duplicated data and the initial results and subjecting output of the cross-referencing to a second named entity recognition classification to generate final results. The method may further include processing the final results to detect any personally identifiable information in the final results.

The source data may comprise indexed columns. The method may further include after de-duplicating the tokenized data, filtering the de-duplicated tokenized data before subjecting the de-duplicated tokenized data to the first named entity recognition classification to generate the second subset of the initial results. Processing of the final results to detect any personally identifiable information in the final results may comprise applying value rules and context rules to the final results.

The method may further include grouping any detected personally identifiable information by service operation names, activity names, or activity identifiers. The final results may include pointers to services responsible for any leaks of the personally identifiable information and pointers to source data where the personally identifiable information originated from. The data associated with the cloud computing system may comprise telemetry and data obtained by performing queries on any services or applications running in the cloud computing system.

In another aspect, the present disclosure relates to a processing system, including at least one processor, the processing system comprising instructions that, when executed by the at least one processor, perform operations including ingest data associated with a cloud computing system to generate source data. The operations may further include after ingesting, as part of a first pass, process the source data by operations including: perform cell-based de-duplication to generate cell-based de-duplicated data, subject the cell-based de-duplicated data to regular expression classification to generate a first subset of initial results, tokenize the cell-based de-duplicated data to generate tokenized data, and de-duplicate the tokenized data and subject de-duplicated tokenized data to a first named entity recognition classification to generate a second subset of the initial results.

The processing system may further include instructions that, when executed by the at least one processor, perform operations, including after performing the first pass, as part of a second pass, cross-reference the cell-based de-duplicated data and the initial results and subject output of the cross-reference operation to a second named entity recognition classification to generate final results. The processing system may further include instructions that, when executed by the at least one processor, perform operations, including process the final results to detect any personally identifiable information in the final results.

The source data may comprise indexed columns. The operations may further comprise an operation to filter the de-duplicated tokenized data before subjecting the de-duplicated tokenized data to the first named entity recognition classification to generate the second subset of the initial results. The operation to process the final results to detect any personally identifiable information in the final results may comprise an operation to apply value rules and context rules to the final results.

The operations may further comprise an operation to group any detected personally identifiable information by service operation names, activity names, or activity identifiers. The final results may include pointers to services responsible for any leaks of the personally identifiable information and pointers to source data where the personally identifiable information originated from. The data associated with the cloud computing system may comprise telemetry and data obtained by performing queries on any services or applications running in the cloud computing system.

In yet another aspect, the present disclosure relates to a method implemented by a processing system, including at least one processor. The method may include ingesting telemetry associated with a cloud computing system and generating batches of source data based on ingested telemetry, where each batch is identifiable using an associated batch identifier. The method may further include as part of a first pass, processing each batch of source data by: performing cell-based deduplication to generate cell-based de-duplicated data, subjecting the cell-based de-duplicated data to regular expression classification to generate a first subset of initial results, tokenizing the cell-based de-duplicated data to generate tokenized data, and de-duplicating and filtering the tokenized data to generate de-duplicated tokenized data and subjecting the de-duplicated tokenized data to a first named entity recognition classification to generate a second subset of the initial results.

The method may further include after performing the first pass, as part of a second pass, cross-referencing the cell-based de-duplicated data and the initial results and subjecting output of the cross-referencing to a second named entity recognition classification to generate final results. The method may further include processing the final results to detect any personally identifiable information (PII) in the final results.

The source data may comprise indexed columns. Processing of the final results to detect any personally identifiable information in the final results may comprise applying value rules and context rules to the final results. The method may further comprise grouping any detected personally identifiable information by service operation names, activity names, or activity identifiers.

The final results may include pointers to services responsible for any leaks of the personally identifiable information and pointers to source data where the personally identifiable information originated from. The data associated with the cloud computing system may further comprises=data obtained by performing queries on any services or applications running in the cloud computing system.

It is to be understood that the systems, services, devices, methods, terminals, and components described herein are merely examples. Alternatively, or in addition, the functionality described herein can be performed, at least in part, by one or more hardware logic components. For example, illustrative types of hardware logic components that can be used include FPGAs, ASICs, Application-Specific Standard Products (ASSPs), System-on-a-Chip systems (SOCs), Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a device, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with, transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method implemented by a processing system, including at least one processor, the method comprising:
    ingesting telemetry data associated with a cloud computing system to generate source data;
    after the ingesting, as part of a first pass, using the at least one processor, processing the source data by:
        performing cell-based de-duplication to generate cell-based de-duplicated data,
        subjecting the cell-based de-duplicated data to regular expression classification to generate a first subset of initial results,
        tokenizing the cell-based de-duplicated data to generate tokenized data, and
        de-duplicating the tokenized data and subjecting de-duplicated tokenized data to a first named entity recognition classification to generate a second subset of the initial results;
    after performing the first pass, as part of a second pass, cross-referencing the cell-based de-duplicated data by comparing the cell-based de-duplicated data with both of the first subset of the initial results and the second subset of the initial results, and subjecting output of the cross-referencing to a second named entity recognition classification to generate final results; and
    using the at least one processor processing the final results to detect any personally identifiable information in the final results.

2. The method of claim 1, wherein the source data comprises indexed columns.

3. The method of claim 1, further comprising after de-duplicating the tokenized data, filtering the de-duplicated tokenized data before subjecting the de-duplicated tokenized data to the first named entity recognition classification to generate the second subset of the initial results.

4. The method of claim 1, wherein processing the final results to detect any personally identifiable information in the final results comprises applying value rules and context rules to the final results.

5. The method of claim 1, further comprising grouping any detected personally identifiable information by service operation names, activity names, or activity identifiers.

6. The method of claim 1, wherein the final results include pointers to services responsible for any leaks of the personally identifiable information and pointers to source data where the personally identifiable information originated from.

7. The method of claim 1, wherein the data associated with the cloud computing system comprises telemetry and data obtained by performing queries on any services or applications running in the cloud computing system.

8. A processing system, including at least one processor, the processing system comprising instructions that, when executed by the at least one processor, perform operations comprising:
    ingest telemetry data associated with a cloud computing system to generate source data;
    after ingesting, as part of a first pass, using the at least one processor, process the source data by operations including:
        perform cell-based de-duplication to generate cell-based de-duplicated data,
        subject the cell-based de-duplicated data to regular expression classification to generate a first subset of initial results,
        tokenize the cell-based de-duplicated data to generate tokenized data, and
        de-duplicate the tokenized data and subject de-duplicated tokenized data to a first named entity recognition classification to generate a second subset of the initial results;
    after performing the first pass, as part of a second pass, cross-reference the cell-based de-duplicated data by comparing the cell-based de-duplicated data with both of the first subset of the initial results and the second subset of the initial results, and subject output of the cross-reference operation to a second named entity recognition classification to generate final results; and
    using the at least one processor, process the final results to detect any personally identifiable information in the final results.

9. The processing system of claim 8, wherein the source data comprises indexed columns.

10. The processing system of claim 8, wherein the operations further comprise an operation to filter the de-duplicated tokenized data before subjecting the de-duplicated tokenized data to the first named entity recognition classification to generate the second subset of the initial results.

11. The processing system of claim 8, wherein the operation to process the final results to detect any personally identifiable information in the final results comprises an operation to apply value rules and context rules to the final results.

12. The processing system of claim 8, wherein the operations further comprise an operation to group any detected personally identifiable information by service operation names, activity names, or activity identifiers.

13. The processing system of claim 8, wherein the final results include pointers to services responsible for any leaks of the personally identifiable information and pointers to source data where the personally identifiable information originated from.

14. The processing system of claim 8, wherein the data associated with the cloud computing system comprises telemetry and data obtained by performing queries on any services or applications running in the cloud computing system.

15. A method implemented by a processing system, including at least one processor, the method comprising:
ingesting telemetry associated with a cloud computing system and generating batches of source data based on ingested telemetry, wherein each batch is identifiable using an associated batch identifier;
as part of a first pass, using the at least one processor, processing each batch of source data by:
performing cell-based deduplication to generate cell-based de-duplicated data,
subjecting the cell-based de-duplicated data to regular expression classification to generate a first subset of initial results,
tokenizing the cell-based de-duplicated data to generate tokenized data, and
de-duplicating and filtering the tokenized data to generate de-duplicated tokenized data and subjecting the de-duplicated tokenized data to a first named entity recognition classification to generate a second subset of the initial results;
after performing the first pass, as part of a second pass, cross-referencing the cell-based de-duplicated data by comparing the cell-based de-duplicated data with both of the first subset of the initial results and the second subset of the initial results, and subjecting output of the cross-referencing to a second named entity recognition classification to generate final results; and
using the at least one processor processing the final results to detect any personally identifiable information (PII) in the final results.

16. The method of claim 15, wherein the source data comprises indexed columns.

17. The method of claim 15, wherein processing the final results to detect any personally identifiable information in the final results comprises applying value rules and context rules to the final results.

18. The method of claim 15, further comprising grouping any detected personally identifiable information by service operation names, activity names, or activity identifiers.

19. The method of claim 15, wherein the final results include pointers to services responsible for any leaks of the personally identifiable information and pointers to source data where the personally identifiable information originated from.

20. The method of claim 15, wherein the data associated with the cloud computing system further comprises data obtained by performing queries on any services or applications running in the cloud computing system.

* * * * *